US006186939B1

(12) United States Patent
Forrester

(10) Patent No.: US 6,186,939 B1
(45) Date of Patent: Feb. 13, 2001

(54) METHOD FOR STABILIZING HEAVY METAL IN A MATERIAL OR WASTE

(76) Inventor: Keith E. Forrester, P.O. Box 2008, Hampton, NH (US) 03843-2008

( * ) Notice: Under 35 U.S.C. 154(b), the term of this patent shall be extended for 0 days.

(21) Appl. No.: 08/876,888

(22) Filed: Jun. 16, 1997

Related U.S. Application Data

(63) Continuation-in-part of application No. 08/729,832, filed on Oct. 8, 1996, which is a continuation of application No. 08/132,926, filed on Oct. 7, 1993, now abandoned.

(51) Int. Cl.[7] .................................. A62D 3/00; B09B 1/00

(52) U.S. Cl. .............................................. 588/256; 405/128

(58) Field of Search ...................................... 405/128, 263, 405/264, 266; 588/249, 252, 256, 257; 210/747

(56) References Cited

U.S. PATENT DOCUMENTS

| | | | | |
|---|---|---|---|---|
| 4,049,462 | | 9/1977 | Cocozza | 106/85 |
| 4,113,504 | | 9/1978 | Chen et al. | 106/97 |
| 4,124,405 | | 11/1978 | Quiénot | 106/111 |
| 4,375,986 | | 3/1983 | Pichat | 106/85 |
| 4,536,034 | | 8/1985 | Otto, Jr. et al. | 299/5 |
| 4,610,722 | | 9/1986 | Duyvesteyn et al. | 75/97 |
| 4,629,509 | | 12/1986 | O'Hara et al. | 106/118 |
| 4,671,882 | | 6/1987 | Douglas et al. | 210/720 |
| 4,737,356 | | 4/1988 | O'Hara | 432/659 |
| 4,804,147 | | 2/1989 | Hooper | 241/24 |
| 4,927,293 | | 5/1990 | Campbell | 405/128 |
| 4,946,311 | * | 8/1990 | Rosar et al. | 405/129 |
| 4,948,516 | | 8/1990 | Fisher et al. | 210/751 |
| 4,950,409 | | 8/1990 | Stanforth | 210/751 |
| 4,975,115 | | 12/1990 | Irons | 75/330 |
| 5,130,051 | | 7/1992 | Falk | 252/315.5 |
| 5,162,600 | | 11/1992 | Cody et al. | 588/236 |
| 5,193,936 | | 3/1993 | Pal et al. | 405/128 |
| 5,196,620 | * | 3/1993 | Gustin et al. | 588/252 X |
| 5,202,033 | * | 4/1993 | Stanforth et al. | 405/128 X |
| 5,207,532 | * | 5/1993 | Mason et al. | 588/252 X |
| 5,234,498 | | 8/1993 | Graves et al. | 588/256 X |
| 5,242,246 | | 9/1993 | Manchak et al. | 405/128 |
| 5,245,114 | | 9/1993 | Forrester | 588/236 |
| 5,252,003 | * | 10/1993 | McGahan | 405/128 |
| 5,284,636 | | 2/1994 | Goff et al. | 588/256 X |
| 5,285,000 | * | 2/1994 | Schwitzgebel | 405/128 X |
| 5,295,761 | | 3/1994 | Heacock et al. | 405/128 |
| 5,302,287 | | 4/1994 | Losack | 210/612 |
| 5,304,706 | | 4/1994 | Hooykaas | 588/252 |
| 5,304,710 | | 4/1994 | Kigel et al. | 405/266 |
| 5,324,433 | | 6/1994 | Grant et al. | 405/128 X |
| 5,387,738 | * | 2/1995 | Beckham et al. | 405/128 X |
| 5,387,740 | * | 2/1995 | Sasae et al. | 405/128 X |
| 5,430,233 | | 7/1995 | Forrester | 588/236 |
| 5,430,235 | | 7/1995 | Hooykass et al. | 405/128 X |
| 5,431,825 | | 7/1995 | Diel | 210/719 |
| 5,512,702 | | 4/1996 | Ryan et al. | 405/128 X |
| 5,536,899 | | 7/1996 | Forrester | 588/256 |
| 5,538,552 | | 7/1996 | Osing et al. | 588/256 X |
| 5,545,805 | | 8/1996 | Chesner | 588/256 |
| 5,569,155 | | 10/1996 | Pal et al. | 588/256 |
| 5,582,573 | * | 12/1996 | Weszely | 588/257 |
| 5,591,116 | * | 1/1997 | Pierce | 588/256 |
| 5,667,696 | | 9/1997 | Studer et al. | 210/702 |
| 5,722,928 | | 3/1998 | Forrester et al. | 588/256 |
| 5,846,178 | | 12/1998 | Forrester | 588/256 |
| 5,860,908 | | 1/1999 | Forrester | 588/256 |

FOREIGN PATENT DOCUMENTS

| | | |
|---|---|---|
| 2 227 515 | 11/1994 | (GB) . |
| WO92/16262 | 10/1992 | (WO) . |

* cited by examiner

*Primary Examiner*—Dennis L. Taylor
(74) *Attorney, Agent, or Firm*—Hamilton, Brook, Smith and Reynolds, P.C.

(57) ABSTRACT

Heavy metal bearing materials during production, processing and/or handling, and/or in landfills, storage or retention areas are stabilized prior to the generation of management as a waste by applying heavy metal stabilizing agents into the product stream thus avoiding complex and costly processing, permitting and treatment of waste under hazardous waste regulations.

8 Claims, No Drawings

METHOD FOR STABILIZING HEAVY METAL IN A MATERIAL OR WASTE

RELATED APPLICATIONS

This is a continuation-in-part application of U.S. Ser. No. 08/729,832, filed Oct. 8, 1996, which is a File Wrapper Continuation application of U.S. Ser. No. 08/132,926, filed Oct. 7, 1993 (now abandoned), the teachings of which are incorporated by reference herein in their entirety.

BACKGROUND OF THE INVENTION

Leaching of heavy metal bearing wastes and direct discharges of heavy metal bearing waste waters has been of concern to environmental regulators, waste producers and various health officials since the 1970's. This concern resulted in the promulgation of the Resource Conservation and Recovery Act (RCRA) in 1979. Under RCRA, solid wastes may be considered hazardous if the waste leaches excessive heavy metals under the Toxicity Characteristic Leaching Procedure (TCLP) as set forth in the Federal Register, Vol. 55, No. 61 (Mar. 29, 1990) and which corresponds in pertinent part to the procedure set forth in the Federal Register, Vol. 55, No. 126, pp.26985–26998 (Jun. 29, 1990). In addition, there exist various states such as California, Michigan and Vermont which require additional leaching tests on solid waste in order to classify the waste and direct the more heavy metal leaching wastes to hazardous waste landfills.

In order to avoid having solid wastes be required to be handled at more expensive hazardous waste landfills, various researchers and solid waste businesses have investigated and developed methods to control the leaching of heavy metals, such as lead from the solid waste. The art has looked at the control of leaching by ex-situ methods involving portland cement, silicates, sulfates, phosphates and combinations thereof. See U.S. Pat. Nos. 4,629,509 (calcium sulfide); 4,726,710 (sodium sulfur oxide salt); the teachings of which are incorporated herein by reference in their entirety.

SUMMARY OF THE INVENTION

Existing heavy metal treatment processes are designed and operated in a post-waste production mode or remediation mode and thus ignore the advantages of adding stabilizing agents into the product stream prior to or during waste production. The invention is based upon the discovery that heavy metal in heavy metal bearing materials or wastes can be stabilized within a product stream or during waste production, such that the heavy metal does not leach from the waste under appropriate conditions known to cause leaching. The invention provides a method that effectively treats any heavy metal bearing material or waste by the use of stabilizing agents, such that the stabilized waste will resist the leaching of heavy metals such as, but not limited to copper, zinc, lead and cadmium.

The invention can be used for in-line heavy metal stabilization which allows for hazardous and solid waste treatment without the need for any post-waste production mixing device, yet permits the treated material or waste to remain free flowing. The stabilizing agent(s) can be added directly to the material prior to its generation as a waste which must then be classified pursuant to RCRA. An advantage of this process is the elimination of the need to treat the waste as a hazardous waste under RCRA. Hazardous waste treatment permitting can also be obviated. Furthermore, the USEPA requires that hazardous wastes be "treated in an enclosed form" prior to collection of wastes if one wishes to be exempt from permitting requirements.

The invention is particularly useful for pre-waste stabilization. This involves the injection of particulate water insoluble or water soluble precipitants, flocculants, coagulants and/or mineral salts directly into the processing lines of auto-shredders, wire stripper and wire-chopping systems such that the first generation point of fines, dust, waste, fluff and/or plastics have been seeded with such stabilizing agents and thus the produced waste will pass TCLP criteria and thus be exempt from RCRA Part B permitting.

The method can also be used for stabilizing heavy metal in a paint containing the same. A stabilizing agent or combination of stabilizing agents described herein is (are) applied onto a painted surface before the paint is removed from the surface by methods such as grit blasting or scraping. The advantage of the pre-waste stabilizer additive here is that the collection of the heavy metal bearing waste will not be as necessary for environmental and/or TCLP waste handling reasons, and upon any such collection the grit and paint products will have been seeded thus requiring no RCRA permitting for hazardous waste treatment or handling.

The invention provides a method of TCLP leaching criteria and/or other relevant leaching tests in order to characterize the waste as non-hazardous and/or to reduce the solubility of the heavy metal bearing waste to a point considered suitable by the appropriate local, state and/or federal leaching criteria.

DETAILED DESCRIPTION OF THE INVENTION

One of the most costly environmental tasks facing industry in the 1990's will be the clean-up and treatment of heavy metal bearing wastes, both solid and hazardous, at old dump sites, storage areas and retention areas and at existing waste generation sites, such as process facilities or incinerators throughout the world. Depending on the specific state and federal regulations, those wastes will be classified as either solid, special or hazardous. The management options for the waste producer vary greatly depending upon the waste classification and the regulatory requirements associated with that classification. The most stringent waste classification is that of hazardous.

There exist various methods of stabilizing and solidifying heavy metal bearing hazardous wastes. The most common method, using portland cement for physical solidification, is common knowledge in the environmental engineering field. There exist several patented processes for hazardous waste treatment such as using carbonates, polysilicates, phosphates and versions of portland cement. These patented methods and the use of portland cement all recognize the need to control chemistry and provide for mixing of the waste and the treatment chemicals in order to control heavy metal solubility, as tested by the TCLP Federal acetic acid leaching test, by either precipitation of the heavy metal into a less soluble compound or the physical encapsulation of the waste and surface area reduction.

Wastes subject to regulation are usually tested via the USEPA TCLP extraction method. The TCLP extraction method is referred to by the USEPA SW-846 Manual on how to sample, prepare and analyze wastes for hazardousness determination, as directed by the Resource Conservation and Recovery Act (RCRA). The TCLP test by definition assumes that the waste of concern is exposed to leachate from an uncovered trash landfill cell, thus the TCLP procedure calls for the extraction of the waste with a dilute acetic acid solution which simulates co-disposal with decaying solid waste.

Previous hazardous waste treatment processes for reducing the leachability of heavy metal bearing wastes have failed to consider the use of pre-waste stabilizer seeding. Prior methods failed to exploit using the TCLP extractor as a miniature Continuous Flow Stirred Tank Reactor (CFSTR) in which complex solubility, adsorption, substitution, exchange and precipitation can occur as well as macroparticle formations. The invention presented herein utilizes the TCLP, WET and/or distilled leaching (DI) extractor as a continuous stirred tank reactor similar to that used in the wastewater industry for formation of flocculants, coagulants and precipitant reactions. See Metcalf & Eddy, 2nd Ed., McGraw Hill, "Waste Water Engineering Treatment/Disposal/Reuse", 1979. In addition, the invention presented herein utilizes post-extraction filtration with 0.45 micron filters as the method of formed particle capture and removal similar to that conducted by rapid sand filtrators used with the wastewater and water treatment fields. Existing heavy metal treatment processes are designed and operated relying upon a post-waste production treatment. However, these approaches ignore the regulatory, processing, handling and permitting advantages of combining stabilizing agents such as retaining matrices, coagulants and precipitants with the material to be wasted prior to such waste activity.

The invention relates to the pre-waste production stabilization of heavy metal bearing hazardous and/or solid waste subject to direct aqueous analyses, solid phase acid leaching, distilled water extraction, the California Citric Acid Leaching test and other citric leaching tests and/or Toxicity Characteristic Leaching Procedure. Heavy metal can be stabilized (i.e., not subject to leaching under appropriate conditions) by contacting the material with flocculants, coagulants (e.g, ferric sulfate) and heavy metal precipitants (e.g., TSP or phosphate rock). These terms are intended herein to be collectively referred to as "stabilizing agents". The stabilizing agent is added to the material production, development or process prior to the first generation of any waste material. This approach responds directly to the RCRA requirement that exempt treatment of hazardous wastes be in a totally-enclosed fashion, as well as allowing for stabilization of heavy metal bearing particles to occur in a pre-mixed and as-produced manner in order to assure consistent and accurate ability to pass the waste extraction method of interest. Thus, the need for post-produced waste mixing, feed controls, collection as a waste, storage manifesting, and expensive and burdensome post waste treatment is obviated.

In the method of invention, a stabilizing agent can be used to reduce the leachability of heavy metals, such as lead, copper, zinc, chromium and cadmium, from a heavy metal bearing material by contacting the stabilizing agent with the material which will ultimately be generated into waste, or with the generated waste while in the waste generation stream. Wastes or materials stabilizable by this method include various types of materials from which heavy metals can leach when subjected to conditions known to cause leaching, such as, but not limited to, natural leaching, runoff, distilled water extraction, sequential extraction, acetic acid, TCLP and/or citric acid leaching or extraction. Examples of such heavy metal leachable wastes, include but are not limited to, wire chop waste, wire stripping waste, auto shredder fluff, auto shredder products containing heavy metals, sludges from electroplating processes, waste collected from baghouse and cyclone collectors, sand blast waste, foundry sand, and ash residues, such as from electroplating processes, arc dust collectors, cupola metal furnaces, and the combustion of medical waste, municipal solid waste, commercial waste, sewage sludge, sewage sludge drying bed waste and/or industrial waste.

In one embodiment, a stabilizing agent is contacted with a material prior to generating a waste from the material. For example, the stabilizing agent can be contacted with the material before or while the material is in a waste generation stream. Further, the stabilizing agent can be directed onto the material while in said stream and/or onto the waste generation equipment which transports the material and/or operates upon the material to form the heavy metal bearing waste. For example, to reduce heavy metal leachability from wire chopping, wire strippers and auto shredder wastes, such as fluff and plastic wire housings, a stabilizing agent is contacted (e.g., applied, coated, sprayed, impregnated) to the material before it is sent through waste generation equipment, such as auto shredders, wire choppers, wire strippers or other conveying units and handling units. Thus, the heavy metal contained in the material is stabilized prior to its conversion into a waste. In addition to or alternatively, the stabilizing agent can be contacted to material as it passes through the waste generation equipment. Such method is considered to be an in situ process that yields a waste having the heavy metal stabilized thereto.

In another embodiment, heavy metal leachability from wastes, which are generated by stripping or chopping insulated wires, such as wire or fluff mixed with PVC or paper, which surrounded the wire and plastic housing, are reduced by adding a stabilizing agent to the waste generation stream. The stabilizing agent can be added to the wire prior to, during or after, strippers, primary and/or secondary choppers, separating beds, pneumatic lines, cyclones or other handling or processing equipment.

For wire and/or cable stripping, the application of a stabilizing agent to an existing heavy metal bearing housing (e.g., lead bearing PVC housing) on a wire prior to separation of that housing from the wire shall be conducted in a manner that allows the stabilizing agent to adhere to the heavy metal bearing housing, or remain with the housing as produced, such that the minimum amount of agent is available per unit area of wire housing to assure passage of the TCLP test upon removal of the adhered agent and housing by wire stripping or wire chopping. It is preferred that the stabilizing agent be applied to the housing by spraying means with an adhesive or coating agent such that the coating will attach to the housing surface and remain on such surface until removal by dilute acetic acid solubility under the TCLP test on the sections of wire used for TCLP analyses. The preferred stabilizing agent is water soluble or water insoluble phosphates including pulverized triple super phosphate, pulverized phosphate rock, although certain silicates, magnesium oxides, sulfides and carbonates may also be found suitable for TCLP Pb control in the resulting combined PVC and coating agent after the chopping or cutting of the PVC for production of a TCLP sample for analyses.

Heavy metal contained in paints can also be stabilized using the methods of this invention. For instance, the leachability of waste, generated from sand blasting a surface that was painted with a heavy metal bearing paint, can be reduced by contacting a stabilizing agent with the paint particles as the paint particles are generated by sand blasting. Preferably, a heavy metal based painted surface is coated with a stabilizing agent prior to removal (e.g., via sand blasting) of the heavy metal bearing paint. An efficient and effective method of coating is by spraying or painting the stabilizing agent onto the surface to be treated. Alternatively, the stabilizing agent can be blended with the grit used for sand blasting prior to blasting the painted surface.

For heavy metal containing paints and in particular Pb or Cu based painted surfaces, the application of a stabilizing agent to an existing painted structure (such as, but not limited to, a bridge, water tower, utility pole, ship, building or fencing) shall be conducted in a manner that allows the stabilizing agent to adhere to the painted surface, such that the minimum amount of agent is available per unit surface area of paint to assure passage of the TCLP test upon removing of the adhered agent and underlying paint by sand blasting, scraping, impinging or other means of leaded paint removal. It is preferred that the stabilizing agent be applied by spraying means in combination with an adhesive or coating agent such that the adhesive or coating agent allows the stabilizing agent to attach to the surface of the paint and remain attached until removal of the newly combined layers by sand blasting or mechanical means. The preferred stabilizing agents are water soluble or water insoluble phosphates, although certain silicates, magnesium oxides, sulfides and carbonates may also be found suitable for Pb and Cu water leaching and TCLP control in the resulting combined paint, stabilizing agent and cleaning grit waste remaining after the structure paint removal process.

Heavy metal can be stabilized by the methods of this invention using a water soluble or water insoluble stabilizing agent, for example, a flocculent, coagulant and/or precipitant or mixture thereof, such as ferric chloride, sulfides, alum, ferric sulfate, feldspar, silicates, clays, activated alumina, carbonates, mineral salts, phosphates or wastes comprising these elements, in sufficient quantity such that the treatment chemicals are dispersed onto or into the pre-waste material such that the produced waste will pass the regulatory limits imposed under the acid leaching tests, similar aggressive or natural and distilled water leaching environments. Particularly, preferred stabilizing agents include triple super phosphate, diammonium phosphate, phosphate rock, crop production phosphate, pulverized phosphate rock, magnesium oxide, sodium silicate, lime and dolomitic lime. The ratio and respective amount of the applied stabilizing agent added to a given heavy metal bearing material will vary depending on the character of such heavy metal bearing material, the process in which the waste is produced, heavy metal content and post-waste treatment handling and use objectives. It is reasonable to assume that the optimization of highly thermodynamically stable minerals which control leaching of metal, such as lead, will also vary from waste type, particularly if the waste has intrinsic available forms of Cu, Al(III), sulfate, and Fe. The stabilizing agents can be first solubilized or put into slurry or suspension in an appropriate aqueous medium and then applied onto the material or waste, such as by spraying, coating, painting, dipping and brushing. Alternatively, powdered or particulate forms can be contacted to or integrated into the material matrix to the material or waste depending upon the nature of the material and its processing equipment.

Prior to the present invention, waste treatment methods were known to be cost intensive to ensure adequate waste-to-treatment additive mixing with heavy equipment, waste handling and excavation. The invention presented herein changes that basis, and stands on the principle that pre-seeding the material before it is generated into a waste will suffice for any and all forms of mixing and that regulators will allow for such seeding such that produced rainfall or simulated rainfall would carry the treatment chemical to areas which, by natural leaching pathways, demand the most intensive epoxy, flocculent, coagulant and precipitant treatment. For example, a stabilizing agent is added to the top of the waste pile and is then dispersed into said pile by leaching. Alternatively, a stabilizing agent can be tilled into the first several feet depth of the product in a product pile, thereby allowing a time release of the stabilizing agent into the produce pile and leaching resulting from rainfall, and/or the leaching can be induced, such as by spraying or injecting water at the surface of the product pile or below the surface of the product pile.

The present invention also utilizes the mixing time and environment provided within the waste producing equipment and the extraction device, thus deleting the need for the treatment additives to be mixed within the field. The sampling population required under SW-846, in addition to the mixing within the waste producing equipment and the extractor, provide for ample inter-particle action and avoid the need for expensive bulk mixing used with cements and common precipitant treatments which are commercially used on full scale waste treatment and site remediation activities.

The general approach of the pre-waste stabilization technology described herein can be utilized in many waste generation systems such as incinerators producing ash materials, wastewater sludge production, drilling tailings production and storage tank sludge collection. The specific application of stabilization agents into the process prior to the generation of wastes would depend upon the material and heavy metal content, type and post-treatment use objectives.

The invention will now be illustrated by the following examples which are not intended to be limiting in any way:

EXAMPLES

Example 1

In this example, a medium grit sand blast was mixed with a 100 mesh agglomerated diammonium phosphate prior to sand blasting a Pb bearing paint. As shown in Table 1, the grit was initially subjected to TCLP leaching without the pre-waste treatment and secondly with 4 percent by weight diammonium phosphate. The results show that the combination of grit blast black beauty material and dry agglomerated phosphate met the regulatory limits of 5.0 ppm soluble Pb under the TCLP acid leaching test. The extraction used a 1000 ml tumbler and extraction fluid of TCLP1 in accordance with the TCLP procedure. Pb was analyzed by ICP after filtration of a 100 ml aliquot through a 45 micron glass bead filter.

TABLE 1

Pb from Sand Blast Residues Subject to TCLP Leaching

| Untreated | 4% DIAMMONIUM PHOSPHATE |
|---|---|
| 47 ppm | <0.05 ppm |

Example 2

In this example, a copper wire material after initial chopping was mixed on-line with Triple Super Phosphate prior to separation of the wire from the housing through a copper liberation chopping unit and thus prior to any generation of waste. The addition of Triple Super Phosphate was controlled by a vibratory feeder with a slide gate to control the volumetric rate of Triple Super Phosphate to the sections of wire passing by on a vibratory conveyor. After the on-line mixture, the wire and additive were subjected to high speed chopping (i.e., liberation) and air separation of the plastic housings and paper from the copper wire. At this point in the process, the wire in considered a product and thus exempt from TCLP testing. The removed plastic and paper is lead bearing, and unless treated as above, is considered a hazardous waste. The combination of the wire waste and the Triple Super Phosphate resulted in a waste which passed TCLP testing, and was thus allowed to be managed as a solid waste or for reuse and recycling.

TABLE 2

Wire Chopping Wastes Subject to TCLP Leaching

| Untreated | 4% Triple Super Phosphate |
|---|---|
| 8 ppm Pb | <0.5 ppm Pb |

From the above examples, it is apparent that a large number of combinations of products and treatment additives can be mixed prior to the generation of the product waste in order that the waste as generated would contain the sufficient quantity and quality of heavy metal stabilizing additives such that the waste as tested by TCLP would pass regulatory limits and thus avoid the need for post-waste production stabilization. The exact combination of stabilizing additives for each waste can be ascertained by evaluating local waste products and/or chemical supplies and conducting a treatability study using such mixtures that produce the end objective of soluble heavy metal control within the produced waste material in the most cost efficient manner. The exact mix recipe and dosage would probably vary due to the waste stream as shown in the above examples, and will vary depending on the aggressiveness of the leaching test or objective for waste stabilization, but in no event would require undue experimentation.

EQUIVALENTS

Those skilled in the art will recognize, or be able to ascertain using no more than routine experimentation, many equivalents to specific embodiments of the invention described specifically herein. Such equivalents are intended to be encompassed in the scope of the following claims.

What is claimed is:

1. A method for stabilizing a heavy metal in a heavy metal containing paint to reduce leaching of the heavy metal therefrom when said paint is generated into paint waste and is exposed to natural or induced leaching conditions, comprising:

applying a stabilizing agent onto a surface having painted thereon a heavy metal containing paint to produce a treated paint, wherein the stabilizing agent binds to the heavy metal to form a heavy metal complex when exposed to natural or induced leaching conditions; and generating the treated paint by into paint waste in which the heavy metal is complexed to the stabilizing agent when exposed to natural or induced leaching conditions, wherein leaching of the heavy metal from the paint waste is reduced.

2. The method of claim 1, wherein the heavy metal is selected from the group consisting of copper, zinc, lead, cadmium and chromium.

3. The method of claim 1, further comprising selecting the stabilizing agent from the group consisting of flocculants, coagulants, precipitants, complexing agents, epoxy agents and adsorbents.

4. The method of claim 1, further comprising selecting the stabilizing agent from the group consisting of phosphates, carbonates, silicates and sulfides.

5. The method of claim 4, wherein the phosphate is triple super phosphate, diammonium phosphate, phosphate rock or crop production phosphate.

6. The method of claim 1, wherein the paint waste is generated by sand blasting.

7. The method of claim 1, wherein the stabilizing agent is applied as a mixture of sand blast grit and stabilizing agent.

8. The method of claim 1, further comprising testing the leachability of the heavy metal from the paint waste by performing a test selected from the group consisting of Toxicity Characteristic Leaching Procedure, California citric acid leaching test and citric acid leaching test.

* * * * *